J. D. SARVEN.

Carriage Wheel.

No. 4,116. Reissued Sept. 6, 1870.

Witnesses

A. J. Tibbits

J. H. Shumway

James D. Sarven
Inventor
By his Attorney
Wm. E. Earl

N. PETERS, Photo-Lithographer, Washington, D. C.

UNITED STATES PATENT OFFICE

JAMES D. SARVEN, OF NEW HAVEN, CONNECTICUT.

IMPROVEMENT IN CARRIAGE-WHEELS.

Specification forming part of Letters Patent No. 17,520, dated June 9, 1857; reissue No. 3,079, dated August 11, 1868; reissue No. 4,116, dated September 6, 1870.

*To all whom it may concern:*

Be it known that I, JAMES D. SARVEN, formerly of Columbia, Tennessee, now of New Haven, in the county of New Haven and State of Connecticut, have invented new Improvements in Carriage-Wheels; and I do hereby declare the following, when taken in connection with the accompanying drawing and the letters of reference marked thereon, to be a full, clear, and exact description of the same, and which said drawing constitutes part of this specification, and represents, in—

Figure 1:
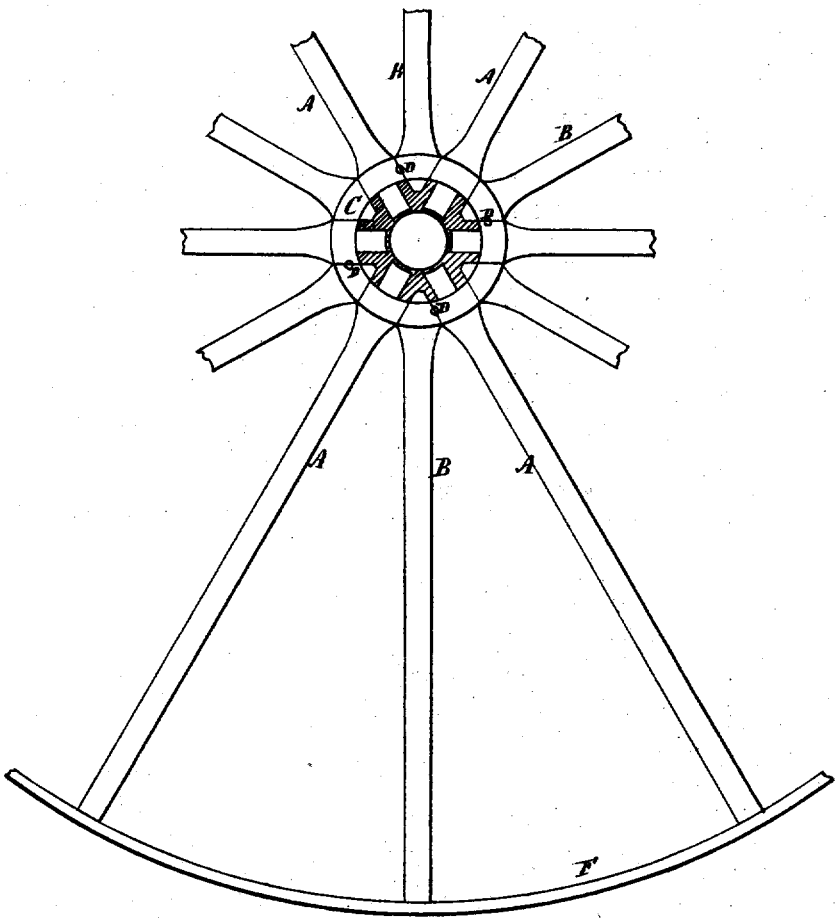
Figure 2:
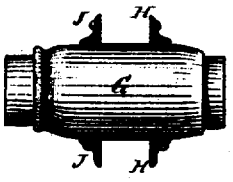
Figure 3:
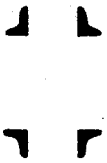
Figure 4:
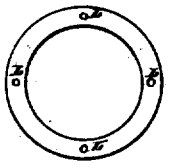

Figure 1, a front view of a wheel, with the front part of the hub removed to show a section of the spokes; Fig. 2, a side view of the hub, to show a section of the flanges; Fig. 3, a sectional view of the flanges detached; and in Fig. 4, an inside view of one of the flanges.

This invention has reference to the construction of wheels with wooden hubs. In the ordinary mode of constructing such wheels the spokes are connected with the hub by means of tenons which enter into mortises formed in the hub, and the spokes outside of the hub are separated by vacant spaces, so that each spoke sustains the strain imposed upon it, independently of the others. In such wheels, moreover, the lateral strain on each spoke is thrown directly upon the tenon. The object of the invention which constitutes the subject-matter of this patent is to retain the advantages incident to the use of a wooden hub, and the connection of the spokes with it by means of tenons and mortises, and, at the same time, to strengthen the spokes at the hub. To these ends the first part of this invention consists in a construction of wheel in which the spokes are combined with the wooden hubs by tenons, and with each other in such a manner that they afford each other mutual support in the immediate vicinity of the hub, or so that the strain applied to any one spoke in the direction of the length of the felly of the wheel is propagated to the adjacent spokes in the vicinity of the hub, and, through them, to the tenons that enter the hub, whereby such strain is distributed among all the tenons that enter the hub, instead of being borne by that one only of the spoke to which the strain is applied. The second part of the invention consists in a construction of wheel in which the spokes are combined with the wooden hub and with each other by means of tenons entering the hub, and by metallic flanges, which embrace the lateral faces of the spokes outside the tenons, and are connected together so that the lateral strains upon the spokes are sustained mainly by the said flanges, and that the tenons are relieved in part or in whole of such lateral strains. The third part of the invention consists in a construction of wheel embodying both the foregoing characteristics, the said wheel being constructed with a mortised wooden hub, with spokes having tenons entering the mortises of said hub, and combined with each other so that a solid belt is formed at the outside of said hub, and with metallic flanges embracing the sides of the spokes in the vicinity of the hub, and connected together so as to form a metallic band through which the spokes pass into the mortises in said hub.

In the drawing I illustrate one method in which my invention may be carried into effect.

In this wheel each alternate spoke A, as in Fig. 1, is constructed with a tenon fitted into a mortise in the hub, in the usual manner. At the hub, and a short distance therefrom, the surfaces of the sides of those spokes are formed flat, and between the spoke A other spokes, B, are fitted, as represented in Fig. 1, so as to form a bearing-surface or solid belt entirely around the hub. Between the mortises for the spokes A, I form recesses sufficient to retain the spokes B in their places. The spokes B are fitted and driven between the spokes A. By this means each tenoned spoke is provided with a bearing extending a greater distance from the center of the wheel than the usual diameter of the hub, whereby the wheel is greatly sustained against the ordinary strain in the direction of the circumference of the wheel, because the strain upon any spoke is propagated, through the belt outside of the hub, to the tenons of the other spokes, and is thus distributed among all the tenons that enter the hub. As a support for the spokes against lateral strains, I construct flanges J and H, which are fitted to pass on over the hub, one upon the inside and the other upon the outside, so as to bear against the faces of the spokes upon both sides; and the two flanges are connected together by bolts passing through or between the spokes, or by other suitable devices, so as to form a metallic band for the hub. These flanges extend outward against the faces of the spokes so as to form a lateral bearing for the spokes, outside of the tenons, and thereby greatly relieve the tenons of the spokes and the mortises of the wooden hub from lateral strains, and proportionately increase the strength of the wheel; and to this end it is essential that the two flanges be connected in some manner between the spokes, so as to form, as it were, a single metallic band around the hub, through which the spokes pass into the mortises in the hub.

Having fully described my invention, and one mode in which it may be carried into effect, I declare that I do not claim the invention of any one of the parts of which my new wheel is composed; but What I do claim as new and useful, and desire to secure by Letters Patent, is—

1. A carriage-wheel constructed with the spokes combined with the wooden hub by tenons entering mortices in said hub, and with each other, in such manner that a solid belt is formed around the said hub, substantially as before set forth.

2. Also, a carriage-wheel constructed with a mortised wooden hub with tenoned spokes, and with flanges which embrace the faces of the spokes in the immediate vicinity of the hub, and are connected together so as to form a metallic band, through which the spokes extend into the mortises in the wooden hub, substantially as before set forth.

3. Also, a carriage-wheel constructed with a mortised wooden hub, with tenoned spokes combined with each other so that a solid belt is formed around the hub, and with metallic flanges which embrace the faces of the spokes in the immediate vicinity of the hub, and are connected together so as to form a metallic band, through which the spokes extend into the mortises in the wooden hub, substantially as before set forth.

JAMES D. SARVEN.

Witnesses:
JOHN E. EARLE,
CHAS. H. YERXA.